US012663689B2

(12) United States Patent
Byun et al.

(10) Patent No.: US 12,663,689 B2
(45) Date of Patent: Jun. 23, 2026

(54) OPTICAL PHASED ARRAY DEVICE AND LIDAR DEVICE INCLUDING THE SAME

(71) Applicant: Samsung Electronics Co., Ltd., Suwon-si (KR)

(72) Inventors: Hyunil Byun, Suwon-si (KR); Woosung Kim, Suwon-si (KR); Kyunghyun Son, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 626 days.

(21) Appl. No.: 18/309,165

(22) Filed: Apr. 28, 2023

(65) Prior Publication Data

US 2024/0192571 A1 Jun. 13, 2024

(30) Foreign Application Priority Data

Dec. 7, 2022 (KR) ........................ 10-2022-0170044

(51) Int. Cl.
*G01S 7/48* (2006.01)
*G01S 7/481* (2006.01)
*G02F 1/29* (2006.01)

(52) U.S. Cl.
CPC ............ *G02F 1/292* (2013.01); *G01S 7/4817* (2013.01)

(58) Field of Classification Search
None
See application file for complete search history.

(56) References Cited

U.S. PATENT DOCUMENTS

| | | | |
|---|---|---|---|
| 2010/0111473 A1 | 5/2010 | Pinguet et al. | |
| 2013/0176621 A1* | 7/2013 | Miller | G02B 26/0833 |
| | | | 216/2 |
| 2015/0346340 A1 | 12/2015 | Yaacobi et al. | |

(Continued)

FOREIGN PATENT DOCUMENTS

| | | | | |
|---|---|---|---|---|
| CN | 106410607 A | * | 2/2017 | ......... H01S 5/06246 |
| KR | 10-2018-0070325 A | | 6/2018 | |

(Continued)

OTHER PUBLICATIONS

Korean Office Action dated Oct. 16, 2024 for corresponding Korean Application No. 10-2022-0170044, and English-language translation thereof.

(Continued)

*Primary Examiner* — Hovhannes Baghdasaryan
(74) *Attorney, Agent, or Firm* — Harness, Dickey & Pierce, P.L.C.

(57) ABSTRACT

An optical phased array device may include a substrate, a light distribution unit configured to distribute input light along a plurality of paths as distributed light, a light modulator configured to modulate a phase of distributed light to establish phase-modulated light, an antenna configured to emit the phase-modulated light, a clad surrounding the light distribution unit, the light modulator, and the antenna and including a first surface facing the substrate and a second surface opposite the first surface, and a reflective layer facing the second surface of the clad. The reflective layer may be configured to reflect the phase-modulated light emitted from the antenna so that reflected light is emitted to an exterior environment that is external to the optical phased array device based on passing through the substrate.

20 Claims, 16 Drawing Sheets

(56)　　　　　References Cited

U.S. PATENT DOCUMENTS

| | | | |
|---|---|---|---|
| 2018/0101083 A1 | 4/2018 | Aflatouni et al. | |
| 2018/0175501 A1 | 6/2018 | Byun et al. | |
| 2019/0033522 A1 | 1/2019 | Baba et al. | |
| 2019/0317198 A1* | 10/2019 | Wang | G01S 7/4818 |
| 2021/0018597 A1 | 1/2021 | Wang et al. | |
| 2021/0263313 A1 | 8/2021 | Malhotra et al. | |
| 2022/0003842 A1* | 1/2022 | Wang | G01S 7/4816 |
| 2022/0037786 A1 | 2/2022 | Lipson et al. | |
| 2022/0128661 A1 | 4/2022 | Wang | |
| 2022/0155419 A1 | 5/2022 | Yu et al. | |

FOREIGN PATENT DOCUMENTS

| | | |
|---|---|---|
| KR | 10-2022-0068832 A | 5/2022 |
| KR | 10-2022-0136346 A | 10/2022 |

OTHER PUBLICATIONS

"First Electrically Pumped Hybrid Silicon Laser", Intel, Sep. 18, 2006.
"Phased array", Wikipedia, retrieved from "https://en.wikipedia.org/w/index.php?title=Phased_array&oldid=1122565355", retrieved Mar. 7, 2023.

\* cited by examiner

OPTICAL PHASED ARRAY DEVICE AND LIDAR DEVICE INCLUDING THE SAME

CROSS-REFERENCE TO RELATED APPLICATION

This application is based on and claims priority under 35 U.S.C. § 119 to Korean Patent Application No. 10-2022-0170044, filed on Dec. 7, 2022, in the Korean Intellectual Property Office, the disclosure of which is incorporated by reference herein in its entirety.

BACKGROUND

1. Field

The inventive concepts relate to optical phased array devices and LiDAR devices including the same.

2. Description of the Related Art

Silicon photonics-based light detection and ranging (Li-DAR) technology has been used to implement a non-mechanical beam steering technology. An optical phased array (OPA), which is a representative non-mechanical beam steering technology, is used to steer light by dispensing light sources into multiple channels and adjusting the phase of each channel. The optical phased array includes an output antenna including a plurality of waveguides having a grating pattern. The output antenna emits light in a downward direction, but a significant portion of the emitted light is also emitted in an upward direction, thereby causing light loss of the optical phased array.

SUMMARY

Some example embodiments provide an optical phased array device with reduced optical loss.

Some example embodiments provide an optical phased array device package with reduced optical loss.

Some example embodiments provide a LiDAR device including an optical phased array device with reduced optical loss.

Additional aspects will be set forth in part in the description which follows and, in part, will be apparent from the description, or may be learned by practice of the presented embodiments of the inventive concepts.

According to some example embodiments of the inventive concepts, an optical phased array device may include a substrate, a light distribution unit configured to distribute input light along a plurality of paths as distributed light, a light modulator configured to modulate a phase of the distributed light to establish phase-modulated light, an antenna configured to emit the phase-modulated light, a clad surrounding the light distribution unit, the light modulator, and the antenna and including a first surface facing the substrate and a second surface opposite the first surface, and a reflective layer facing the second surface of the clad. The reflective layer may be configured to reflect the phase-modulated light emitted from the antenna so that the reflected light is emitted to an exterior environment that is external to the optical phased array device based on passing through the substrate.

The reflective layer may face the antenna on the second surface of the clad.

The optical phased array device may further include an input coupler configured to receive light from the exterior environment.

The reflective layer may include a metal or dielectric.

The reflective layer may include at least one metal selected from silver (Ag), gold (Au), aluminum (Al), platinum (Pt), copper (Cu), chromium (Cr), and nickel (Ni).

The reflective layer may include at least one oxide selected from $SiO_2$, $TiO_2$, $Al_2O_3$, and $Ta_2O_5$, or at least one fluoride selected from $MgF_2$, $LaF_3$, and $AlF_3$.

A width of the reflective layer may be equal to or less than 11 times a width of the antenna.

The reflective layer may include one or more holes that do not overlap with the antenna in a vertical direction extending perpendicular to the substrate.

The antenna may include a plurality of grating patterns.

The optical phased array device may further include a power supply unit connected to the reflective layer and configured to apply heat to the reflective layer.

The optical phased array device may further a first electrode and a second electrode in the light modulator.

The first electrode and the second electrode and the reflective layer may include a same material.

The optical phased array device may further a coating layer under the substrate to face the antenna.

A lower surface of the substrate may have an RMS surface roughness of about 100 Å or less.

In the optical phased array device, an optical connection between the light distribution unit, the light modulator, and the antenna may be implemented as an optical waveguide-based structure.

According to some example embodiments of the inventive concepts, an optical phased array device package may include a base, an optical phased array device on the base, and a connection member connecting the base to the optical phased array device. The optical phased array device may include a substrate, a light distribution unit configured to distribute input light along a plurality of paths as distributed light, a light modulator configured to modulate a phase of the distributed light to establish phase-modulated light, an antenna configured to emit the phase-modulated light, a clad surrounding the light distribution unit, the light modulator, and the antenna and including a first surface facing the substrate and a second surface opposite the first surface, and a reflective layer facing the second surface of the clad. The reflective layer may be configured to reflect the phase-modulated light emitted from the antenna so that the reflected light is emitted to an exterior environment that is external to the optical phased array device based on passing through the substrate.

The connection member may include a wire, and the base may include a hole.

The connection member may include a connection element, and the optical phased array device may be electrically connected to the base through the connection element.

The optical phased array device package may further include a first electrode and a second electrode in the light modulator, an electrode pad under the substrate, and a via penetrating through the optical phased array device, wherein the via connects the first electrode to the second electrode to the electrode pad.

According to some example embodiments of the inventive concepts, a LiDAR device may include a light source, a steering unit, a detector, and a processor, wherein the steering unit includes a substrate, a light distribution unit configured to distribute input light along a plurality of paths as distributed light, a light modulator configured to modulate a phase of the distributed light to establish phase-modulated light, an antenna configured to emit the phase-modulated light, a clad surrounding the light distribution unit, the light modulator, and the antenna and including a first surface facing the substrate and a second surface opposite the first surface; and a reflective layer facing the second surface of the clad. The reflective layer may be configured to reflect and reflecting the phase-modulated light emitted from the antenna so that the reflected light is emitted to an exterior environment that is external to steering unit based on passing through the substrate.

BRIEF DESCRIPTION OF THE DRAWINGS

The above and other aspects, features, and advantages of certain embodiments of the inventive concepts will be more apparent from the following description taken in conjunction with the accompanying drawings, in which.

DETAILED DESCRIPTION

Figure 1:
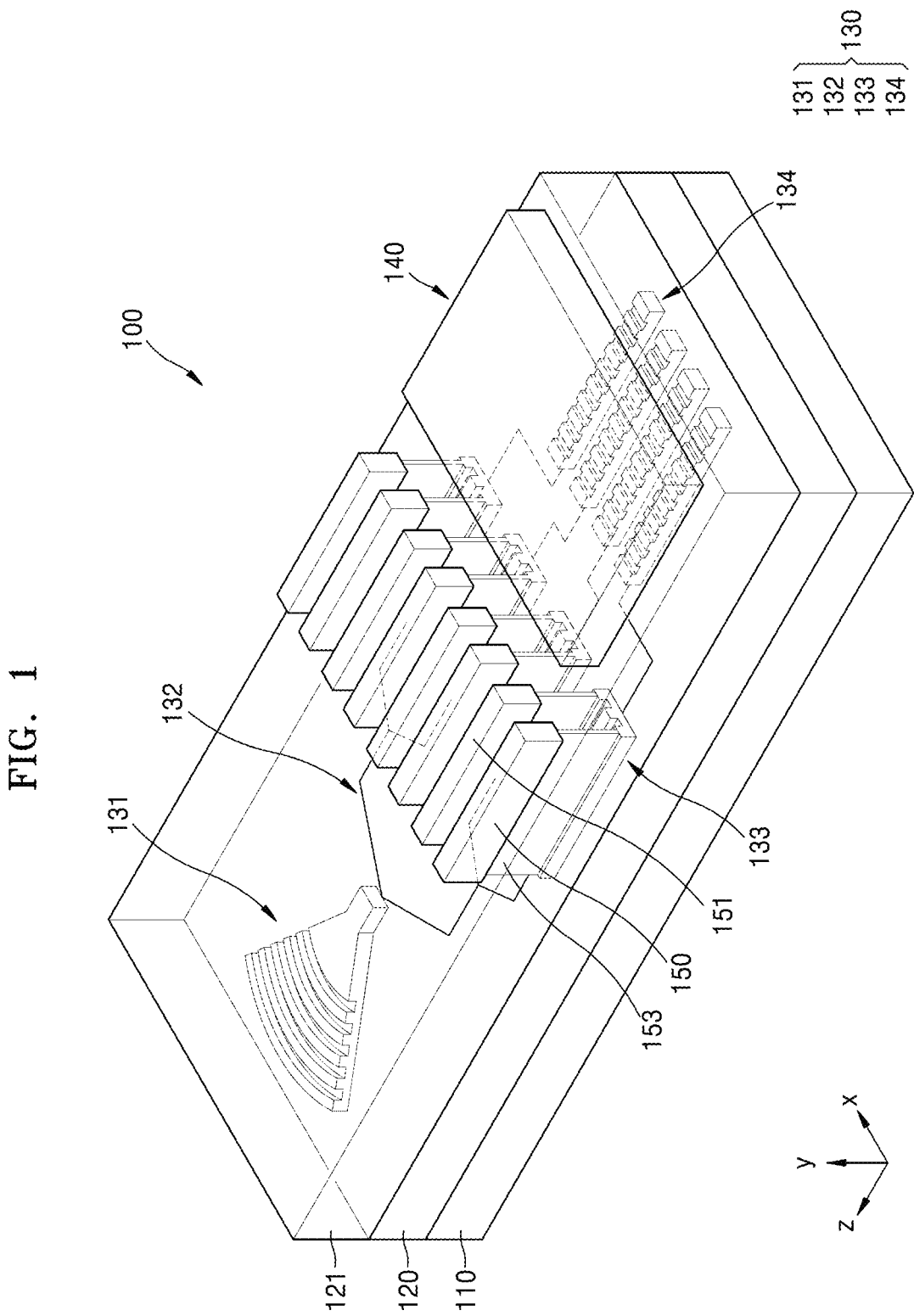
FIG. 1 is a perspective view of an optical phased array device according to some example embodiments.

Reference will now be made in detail to example embodiments, some of which are illustrated in the accompanying drawings, wherein like reference numerals refer to like elements throughout. In this regard, some example embodiments may have different forms and should not be construed as being limited to the descriptions set forth herein. Accordingly, some example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

An optical phased array device (OPA) and a light detection and ranging (LiDAR) device including the same will now be described in detail with reference to the accompanying drawings. In the drawings, like reference numerals refer to like elements throughout, and sizes of elements in the drawings may be exaggerated for clarity and convenience of explanation. The following example embodiments described below are merely illustrative, and various modifications may be possible from some example embodiments of the inventive concepts.

When an element or layer is referred to as being "on" or "above" another element or layer, the element or layer may be directly on another element or layer or intervening elements or layers. In the following embodiments, the singular forms include the plural forms unless the context clearly indicates otherwise. When a part "comprises" or "includes" an element in the specification, unless otherwise defined, it is not excluding other elements but may further include other elements.

In the specification, the term "above" and similar directional terms may be applied to both singular and plural. With respect to operations that constitute a method, the operations may be performed in any appropriate sequence unless the sequence of operations is clearly described or unless the context clearly indicates otherwise. The operations may not necessarily be performed in the order of sequence.

Connections or connection members of lines between components shown in the drawings illustrate functional connections and/or physical or circuit connections, and the connections or connection members may be represented by replaceable or additional various functional connections, physical connections, or circuit connections in an actual apparatus. Unless expressly indicated otherwise, functional elements may include or be controlled by processing circuitry such as hardware, software, or a combination thereof configured to perform a specific function. For example, the processing circuitry more specifically may be and/or include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), electrical components (such as at least one of transistors, resistors, capacitors, logic gates (including at least one of AND gates, OR gates, NOR gates, NAND gates, NOT gates, XOR gates, etc.), and/or the like), etc.

All examples or example terms (for example, etc.) are simply used to explain in detail the technical scope of the inventive concepts, and thus, the scope of the inventive concepts are not limited by the examples or the example terms as long as it is not defined by the claims.

Hereinafter, the terms "above" or "on" may include not only those that are directly on in a contact manner, but also those that are above in a non-contact manner. The singular forms "a," "an," and "the" as used herein are intended to include the plural forms as well unless the context clearly indicates otherwise. It will be understood that the terms "comprise," "include," or "have" as used herein specify the presence of stated elements, but do not preclude the presence or addition of one or more other elements.

The use of the term "the" and similar demonstratives may correspond to both the singular and the plural. Operations constituting methods may be performed in any suitable order unless otherwise indicated herein or otherwise clearly contradicted by context, and are not necessarily limited to the stated order.

The use of all illustrations or illustrative terms in some example embodiments is simply to describe the technical ideas in detail, and the scope of the present inventive concepts is not limited by the illustrations or illustrative terms unless they are limited by claims.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel,"

"coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%)).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

As described herein, an element that is described to be "spaced apart" from another element, in general and/or in a particular direction (e.g., vertically spaced apart, laterally spaced apart, etc.) and/or described to be "separated from" the other element, may be understood to be isolated from direct contact with the other element, in general and/or in the particular direction (e.g., isolated from direct contact with the other element in a vertical direction, isolated from direct contact with the other element in a lateral or horizontal direction, etc.). Similarly, elements that are described to be "spaced apart" from each other, in general and/or in a particular direction (e.g., vertically spaced apart, laterally spaced apart, etc.) and/or are described to be "separated" from each other, may be understood to be isolated from direct contact with each other, in general and/or in the particular direction (e.g., isolated from direct contact with each other in a vertical direction, isolated from direct contact with each other in a lateral or horizontal direction, etc.). Similarly, a structure described herein to be between two other structures to separate the two other structures from each other may be understood to be configured to isolate the two other structures from direct contact with each other.

FIG. 1 is a perspective view of an optical phased array device 100 according to some example embodiments.

Referring to FIG. 1, the optical phased array device 100 includes a substrate 110, a lower clad 120 disposed on the substrate 110, a light source for inputting light, an input coupler 131 configured to input light from the light source to an unit element 130, a light distribution unit 132 configured to distribute a propagation path of input light, a light modulator 133 configured to modulate a phase of the distributed light, an antenna 134 connected to the light modulator 133 to emit modulated light, an upper clad 121 including a first surface surrounding the light distribution unit 132, the light modulator 133, and the antenna 134 and facing the substrate 110 and a second surface opposite to the first surface, and a reflective layer 140 facing the second surface of the upper clad 121 and reflecting light emitted from the antenna 134 so that the reflected light is emitted to the outside passing through the substrate 110. The input coupler 131, the light distribution unit 132, the light modulator 133, and the antenna 134 may be referred to as a unit element 130.

The substrate 110 may include, for example, a silicon (Si) substrate. However, the material of the substrate 110 is not necessarily limited to silicon, and various wafer materials used in the semiconductor manufacturing process may be used as the substrate 110. An exposed surface of the substrate 110, for example, a lower surface of the substrate 110 may be polished smoothly. Thus, light scattering may be prevented, thereby facilitating beam steering. A lower surface of the substrate 110 may have, for example, a root mean square (RMS) surface roughness of about 100 Å or less (e.g., equal to or greater than 0 Å and equal to or less than about 100 Å).

The lower clad 120 may be disposed over an entire upper surface of the substrate 110. The lower clad 120 may include a transparent insulating oxide material. The transparent insulating oxide material may include, for example, silicon oxide ($SiO_2$), but is not necessarily limited thereto. For example, the oxide material of the lower clad 120 may include any material having a refractive index lower than that of a material used as the unit element 130. The lower clad 120 may be interchangeably referred to as a lower cladding, a lower clad layer, a lower cladding layer, a lower clad material, a lower cladding material, or the like.

The upper clad 121 may be disposed on the lower clad 120 to surround the unit elements 130. A surface of the upper clad 121 that contacts the lower clad 120 and faces the substrate 110 may be referred to as a first surface. A surface opposite to the first surface of the upper clad 121 and on which the reflective layer 140 is disposed may be referred to as a second surface. The upper clad 121 may be disposed to completely cover the unit elements 130. The upper clad 121 may act as a protective layer for protecting the unit elements 130. Also, the upper clad 121 may serve as a planarization layer having a flat upper surface. The upper clad 121 may be interchangeably referred to as an upper cladding, an upper clad layer, an upper cladding layer, an upper clad material, an upper cladding material, or the like.

A surface of the upper clad 121 facing the substrate 110 may be referred to as a first surface, and a surface opposite to the first surface on which the reflective layer 140 is disposed may be referred to as a second surface.

The upper clad 121 may include the same transparent insulating oxide material as the lower clad 120. For example, the upper clad 121 may include silicon oxide (SiO2), but is not necessarily limited thereto. For example, the oxide material of the upper clad 121 may include any material having a refractive index lower than that of the material used as the unit element 130.

The upper clad 121 may serve to confine light within the unit element 130 and at the same time release heat generated from the unit element 130 to the outside. In FIG. 1, it is depicted that the upper clad 121 directly contacts the unit element 130, but there may be a gap between the upper clad 121 and the unit element 130, and the gap between the upper clad 121 and the unit element 130 may be filled with an oxide material. The upper clad 121 may have a thickness in a range from about 150 nm to about 1,000 nm.

Because the unit element 130 has a cross-sectional structure surrounded by the upper clad 120 and the lower clad 121, according to the principle of total internal reflection, a light wave may proceed in a confined state without radiating to the outside. In this case, as the refractive index difference between the unit element 130 and the upper clad 120 and the lower clad 121 is greater, light may be more tightly optically confined, and accordingly, light guiding efficiency of a waveguide may be increased.

In FIG. 1, as examples of various unit elements 130 constituting the optical phased array device 100, the input coupler 131, the light distribution unit 132, the light modulator 133, and the antenna 134 are depicted. However, the optical phased array device 100 actually implemented does not necessarily include all of these unit elements 130, and may include only some of these unit elements 130 or other types of unit elements 130 may further be included. Although only one input coupler 131, light distribution unit 132, light modulator 133, and antenna 134 are shown in FIG. 1, an actually implemented optical phased array device 100 may include a plurality of identical unit elements 130 as needed. In addition, positions of the input coupler 131, the light distribution unit 132, the light modulator 133, and the antenna 134 may vary depending on the optical phased array device 100 actually implemented. FIG. 1 does not show an example of the optical phased array device 100 designed to perform a specific function, and merely illustrates various unit elements 130 that may be formed in the optical phased array device 100.

Referring to FIG. 1, the light source is not included in the optical phased array device 100. When the optical phased array device 100 does not include a light source, the light source may be coupled to the optical phased array device 100 by an optical fiber, a grating coupler, or an edge coupler. However, it is not limited thereto, and the light source may be included in the optical phased array device 100.

The light source may be a semiconductor laser device based on a semiconductor substrate. The light source may be manufactured in a small size of about several hundred μm, and the laser light may be directly modulated through the application of current because the driving power is small. The light source may obtain an oscillation wavelength ranging from visible light to infrared light by a selected combination of semiconductor materials. In some cases, the light source may be a wavelength tunable laser diode capable of changing the oscillation wavelength within a particular (or, alternatively, predetermined) range. The light source may output laser light in the form of a pulse wave or a continuous wave.

The input coupler 131 may input an external light source as the unit element 130 by using the diffraction effect of the grating pattern. The input coupler 131 may be formed by partially patterning silicon. The input coupler 131 may be formed to have a particular (or, alternatively, predetermined) grating depth by partially etching and patterning about 40% to 60% of the total thickness of silicon of the input coupler 131.

The light distribution unit 132 may include a structure that includes one or more splitters, for example, a splitter may be disposed at each branch point. In some example embodiments, the light distribution unit 132 may include one or more splitters that may each be (or include) a beam splitter such as a prism and/or half-mirror (e.g., a dichroic mirror, pellicle mirror, etc.) such that light received at a splitter from, e.g., a tunable laser diode, an upstream splitter, or the like, is distributed downstream of the splitter as sub-pieces of the received light (or pieces of sub-light) based on, e.g., incident angle, wavelength, polarity, and/or the like. The light distribution unit 132 may branch a propagation path of light input from the light source through the input coupler 131 two or more times, and the plurality of pieces of sub-light may form a plurality of channels. The light distribution unit 132 includes a plurality of branch points and may distribute input light into a plurality of pieces of sub-light. The light distribution unit 132 may receive light or an optical signal generated from a light source and distribute the light or optical signal to a plurality of waveguides. The light distribution unit 132 may distribute light emitted from a single light source into N (N is a natural number) channels. The light distribution unit 132 may equally distribute light emitted from a single light source to N channels, but the inventive concepts are not limited thereto. The light distribution unit 132 may distribute light emitted from a single light source to N channels in different amounts.

The light distribution unit 132 may branch the input light M times in a saturated binary tree structure to form $2^M$ light paths as distributed light, where "M" may be a natural number. For example, in some example embodiments, the light paths may form a binary tree structure, including M levels and $2^M$ optical paths, which may be referred to as a "perfect binary tree structure" of M levels. In distributing light, the light distribution unit 132 may use splitters that are distributed in a 1:2 ratio by connecting the splitters in multiple stages. The light distribution unit 132 may be formed based on a waveguide, and a splitter may be disposed at each branch point. The light distribution unit 132 may be formed based on a multi-mode interference (MMI) type, and may be configured so that optical coupling loss and optical branching loss are less than or equal to a preset reference value. The light distribution unit 132 may include not only a multimode interferer, but also a star coupler, a Y branch splitter, and a directional coupler formed on a semiconductor substrate.

Although it is shown in FIG. 1 that input light passes through the light distribution unit 132 and is split twice and distributed into four pieces of light, this is a simple example and is not necessarily limited thereto. For example, the input light may pass through the light distribution unit 132 and be divided 5 times to be divided into 32 pieces of light or may be branched 6 times and distributed to 64 pieces of light.

The light modulator 133 may modulate a phase of light. The light modulator 133 may be disposed between the light distribution unit 132 and the antenna 134, such that the light modulator may be configured to modulate a phase of distributed light received from the light distribution unit 132 to establish phase-modulated light. The light modulator 133 may modulate the phase of light distributed from the light distribution unit 132 to each waveguide. The light modulator 133 may include, for example, a P-type semiconductor, an N-type semiconductor, and an active layer waveguide between the P-type semiconductor and the N-type semiconductor, and may modulate the phase of light passing through the active layer waveguide by applying any one of heat, light, current, voltage, and pressure to the active layer waveguide. In some example embodiments, the light modulator 133, including some or each of the P-type semiconductor, the N-type semiconductor, and/or the active layer waveguide between the P-type semiconductor and the N-type semiconductor may include, for example, at least one of a silicon (Si) compound, indium tin oxide (ITO), zinc oxide (ZnO), tin oxide ($SnO_2$), titanium oxide ($TiO_2$), gallium-doped ZnO, and Al-doped ZnO, or any combination thereof. The P-type semiconductor and the N-type semiconductor may include materials, including for example any of the materials described herein, doped with a p-type dopant or an n-type dopant, respectively.

A source of the p-type dopant may include, for example, an ionic liquid such as $NO_2BF_4$, $NOBF_4$, or $NO_2SbF_6$, an acidic compound such as HCl, $H_2PO_4$, $CH_3COOH$, $H_2SO_4$, or $HNO_3$, or an organic compound such as dichlorodicyanoquinone (DDQ), oxone, dimyristoylphosphatidylinositol (DMPI), or trifluoromethanesulfonimide. In another example, the source of the p-type dopant may include $HPtCl_4$. $AuCl_3$, $HAuCl_4$, silver trifluoromethanesulfonate (AgOTf), $AgNO_3$, $H_2PdCl_6$, $Pd(OAc)_2$, $Cu(CN)_2$, or the like.

A source of the n-type dopant may include, for example, a reduction product of a substituted or unsubstituted nicotinamide, a reduction product of a compound which is chemically bound to a substituted or unsubstituted nicotinamide, or a compound comprising at least two pyridinium moieties in which a nitrogen atom of at least one the pyridinium moieties is reduced. For example, the source of the n-type dopant may include nicotinamide mononucleotide-H (NMNH), nicotinamide adenine dinucleotide-H (NADH), or nicotinamide adenine dinucleotide phosphate-H (NADPH), or include viologen. In another example, the source of the n-type dopant may include polymer such as polyethylenimine (PEI). In some example embodiments, the n-type dopant may include alkali metal such as potassium (K) or lithium (Li). The above-mentioned p-type and n-type dopant materials are merely examples, and various other materials may be used as dopants.

The light modulator 133 may further include a first electrode 150 and a second electrode 151 for applying (e.g., configured to apply) a voltage to the active layer. The first electrode 150 and the second electrode 151 may be directly connected to the light modulator 133 or may be connected thereto via one or more conductive structures 153 which may include a same or different material as the first electrode 150, the second electrode 151, and/or the light modulator 133. The first electrode 150 and the second electrode 151 may include the same material as the reflective layer 140. The first electrode 150 and the second electrode 151 may include at least one metal material selected from among silver (Ag), gold (Au), aluminum (Al), platinum (Pt), copper (Cu), chromium (Cr), and nickel (Ni).

The antenna 134 may emit light (e.g., phase-modulated light received from the light modulator 133) from the waveguide to the outside (e.g., an exterior environment that is external to the optical phased array device 100). The antenna 134 may include a plurality of grating patterns. The plurality of grating patterns may be arranged in a z direction. The plurality of grating patterns may be respectively connected to a plurality of light modulators 133. Each grating pattern may emit light, a phase of which is modulated by the light modulator 133. The traveling direction of output light emitted by the antenna 134 may be determined by a phase difference between the split pieces of light, a distance between the grating patterns, a height of the grating pattern, and a width of the grating pattern.

The antenna 134 may be formed by partially patterning silicon. The antenna 134 having a particular (or, alternatively, predetermined) grating depth may be formed by partially etching and patterning about 10% of the thickness of the silicon constituting the antenna 134. Meanwhile, the antenna 134 may include various materials other than silicon. Antenna 134 may include a metal or alloy. The antenna 134 may include, for example, a metal or alloy including at least one of silver (Ag), gold (Au), aluminum (Al), and platinum (Pt). Also, the antenna 134 may include metal nitride. The antenna 134 may include, for example, a metal nitride, such as TiN or TaN.

Although not shown in the drawing, the optical phased array device 100 may include a plurality of optical amplifiers (not shown) each disposed on the waveguide. An optical amplifier may be disposed in an optical path between the input coupler 131 and the light modulator 133 to amplify the amount of a plurality of pieces of sub-light. Specifically, the optical amplifier may receive a current from an external power source and generate amplified light using energy of the provided current. An optical amplifier may be disposed in each of a plurality of optical paths formed between an initial branch point and a final branch point. The optical amplifier may be implemented as a Fabry-Perot Amplifier (FPA) type or a Traveling Wave Amplifier (TWA) type. For example, the optical amplifier may include a semiconductor optical amplifier or an ion-doped amplifier. In general, the semiconductor optical amplifier may be manufactured in a small size, operate in 1310 nm and 1150 nm wavelength bands, and transmit in both directions, and the optical amplifiers may also have such characteristics. Each of the plurality of optical amplifiers may amplify the light distributed from the light distribution unit 132 with the same gain, but the inventive concepts are not limited thereto. Each of the plurality of optical amplifiers may amplify the light distributed from the light distribution unit 132 with different gains.

The optical phased array device 100 may include a plurality of optical waveguides that sequentially transfer light generated from the light source to the input coupler 131, the light distribution unit 132, the light modulator 133, and the antenna 134. That is, an optical connection between the input coupler 131, the light distribution unit 132, the light modulator 133, and the antenna 134 may be formed in an optical waveguide-based structure. A general semiconductor or insulator material may be used as the optical waveguide. The waveguide may include a rib waveguide having one vertical protrusion, a rib waveguide having a plurality of vertical protrusions, and/or a channel waveguide having no protrusion.

Figure 2:
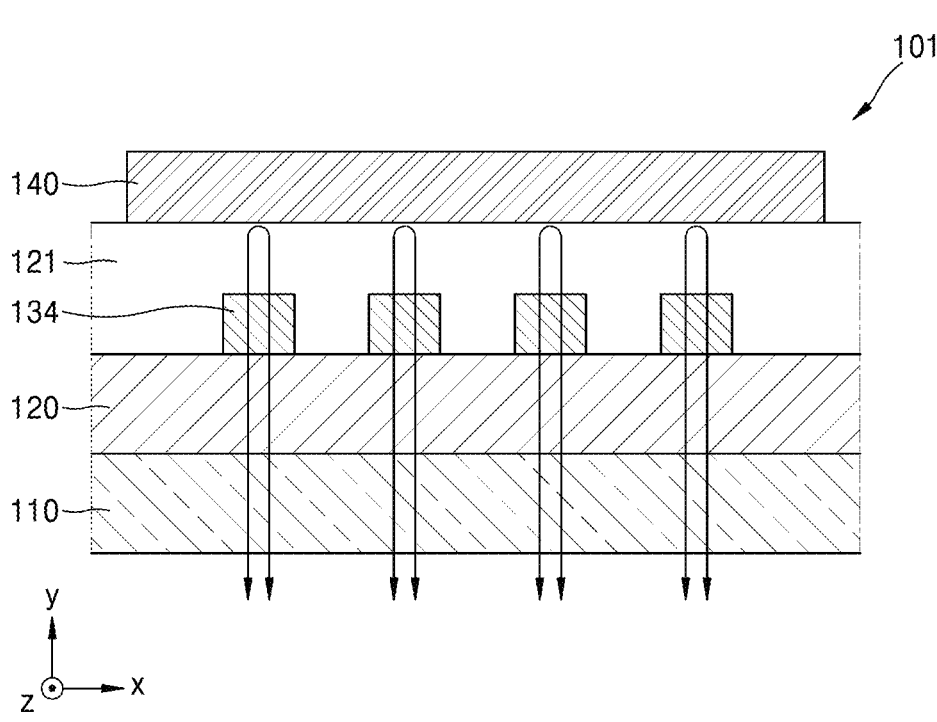
FIGS. 2 and 3 are cross-sectional views showing a portion of an optical phased array device according to some example embodiments.
Figure 3:
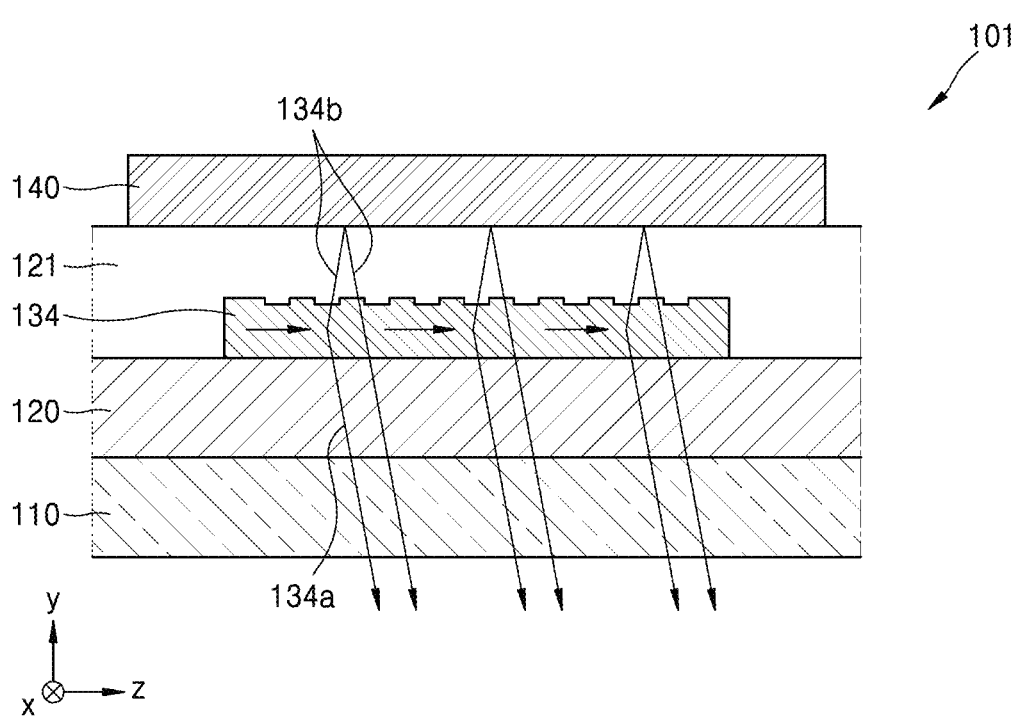

FIGS. 2 and 3 are cross-sectional views showing a portion of the optical phased array device 101 according to some example embodiments.

FIG. 2 is a cross-sectional view of the optical phased array device 101 on an xy plane, and FIG. 3 is a cross-sectional view of the optical phased array device 101 on an yz plane.

Referring to FIGS. 2 and 3, the optical phased array device 101 may include a substrate 110, a lower clad 120 disposed on the substrate 110, a light distribution unit 132 configured to distribute a propagation path of input light into a plurality of paths as distributed light, a light modulator 133 configured to modulate a phase of the distributed light, an antenna 134 connected to the light modulator 133 and emitting phase-modulated light, an upper clad 121 surrounding the light distribution unit 132, the light modulator 133, and the antenna 134 and including a first surface facing the substrate 110 and a second surface opposite to the first surface, a reflective layer 140 facing the second surface of the upper clad 121 and reflecting light emitted from the antenna 134 so that the reflected light is emitted to the outside passing through the substrate 110. In describing FIGS. 2 and 3, descriptions already given with reference to FIG. 1 will be omitted.

The reflective layer 140 may be disposed above the antenna 134. The reflective layer 140 may be disposed on the second surface of the upper clad 121 and at least partially overlap the antenna 134 in a vertical direction extending perpendicular to the substrate 110 (e.g., the y direction). The reflective layer 140 may improve light efficiency of the optical phased array device 101, thereby improving operational efficiency of the optical phased array device 101, a LiDAR device including same, etc. by reflecting incident light and directing the reflected light in one direction. The reflective layer 140 may reflect light directed in a +y direction from the antenna 134 (e.g., phase-modulated light 134b emitted from the antenna 134 in the +y direction) and direct it (e.g., the reflected phase-modulated light 134b) in a −y direction. The reflective layer 140 may reflect light emitted from the antenna 134 with different phases and direct all of them (e.g., all of the light emitted from the antenna 134 with the different phases) toward the −y direction. The reflected light may be directed by the reflective layer 140 to be emitted to an exterior environment that is external to the optical phased array device 101 based on passing through the substrate 110 (e.g., based on passing in the vertical direction through a y direction level occupied by the antenna 134). As a result, both the phase-modulated light 134a emitted from the antenna 134 in the −y direction and the phase-modulated light 134b initially emitted from the antenna 134 in the +y direction and reflected by the reflective layer 140 in the −y direction are emitted from the optical phased array device 101 to an exterior environment that is external to the optical phased array device 101, in the same −y direction (e.g., comprising a LiDAR device emitted light beam), based on passing through the substrate 110. Thus, light efficiency of the optical phased array device 101 is improved as light emitted in the +y direction is re-directed to the −y direction (e.g., to comprise a LiDAR device emitted light beam) to combine with the light directly emitted in the −y direction from the antenna 134 instead of being lost, thereby improving operational efficiency of the optical phased array device 101, a LiDAR device including same, etc. (e.g., reduced power consumption) and/or improved operational performance thereof (e.g., increased LiDAR device emitted light beam intensity without corresponding increase in input light intensity and thus without increased power consumption by light source).

The reflective layer 140 may include a metal material. The reflective layer 140 may include the same metal material as the antenna 134. The reflective layer 140 may include, for example, at least one metal material selected from among silver (Ag), gold (Au), aluminum (Al), platinum (Pt), copper (Cu), chromium (Cr), and nickel (Ni).

The reflective layer 140 may include a dielectric. The reflective layer 140 may include oxide. The reflective layer 140 may include, for example, materials, such as $SiO_2$, $TiO_2$, $Al_2O_3$, and $Ta_2O_5$. The reflective layer 140 may include fluorides. The reflective layer 140 may include, for example, materials, such as $MgF_2$, $LaF_3$, and $AlF_3$.

Figure 4A:
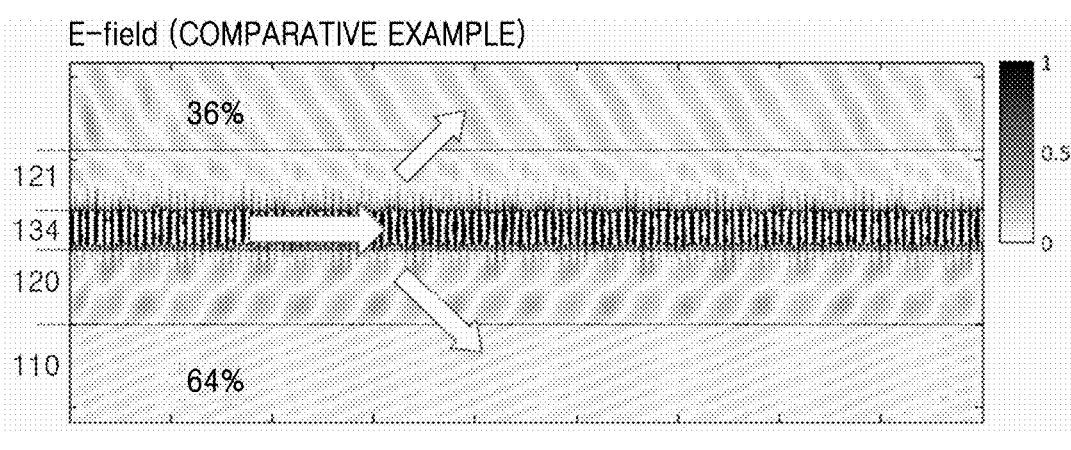
FIGS. 4A and 4B are diagrams illustrating simulation results for electric field distribution around an antenna in an optical phased array device according to some example embodiments.
Figure 4A:
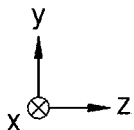
Figure 4B:
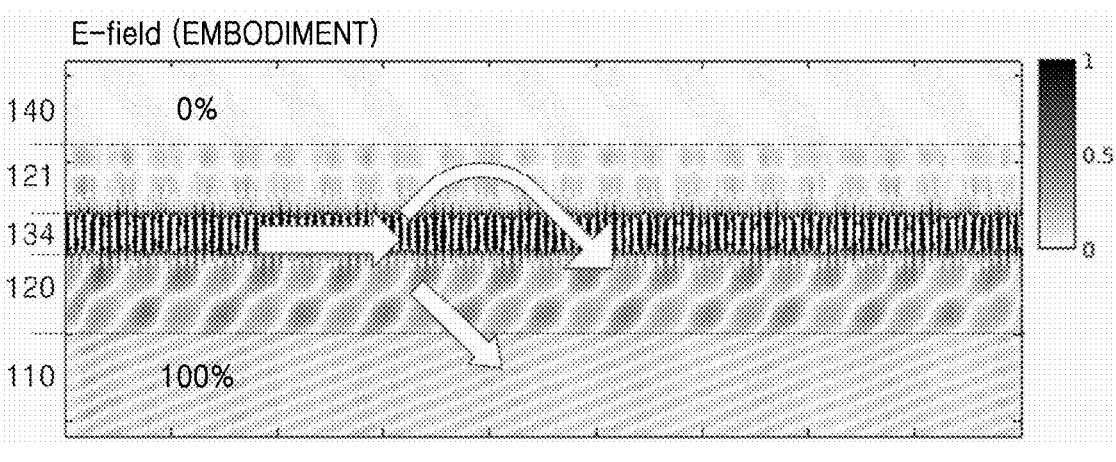
Figure 4B:
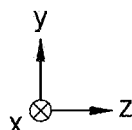

FIGS. 4A and 4B are diagrams illustrating simulation results for electric field distribution around an antenna in an optical phased array device according to some example embodiments.

Referring to the comparative example of FIG. 4A, in an example in which a reflective layer is not disposed on an antenna of an optical phased array device, it is indicated that about 36% of light emitted from the antenna is directed in the +y direction and about 64% is directed in the −y direction. In some example embodiments, referring to some example embodiments, including the example embodiments of FIG. 4B, in some example embodiments in which a reflective layer is disposed on an antenna of an optical phased array device, about 100% of light emitted from the antenna is directed in the −y direction. When the reflective layer is disposed on the antenna, a power increase effect of, for example, about 4.4 dB may be produced compared to the case when the reflective layer is not disposed (e.g., is absent from the optical phased array device), thereby enabling an improvement in operational performance and/or efficiency of the optical phased array device, which may enable an improved light emission performance (e.g., beam intensity) and/or improved power consumption (e.g., reduced power consumption) by a device including the optical phased array device (e.g., the optical phased array device utilizing a lower-intensity input light based on lower power consumption by the light source without loss of intensity of light emitted from the optical phased array device in relation to an optical phased array device that omits the reflective layer).

Figure 5:
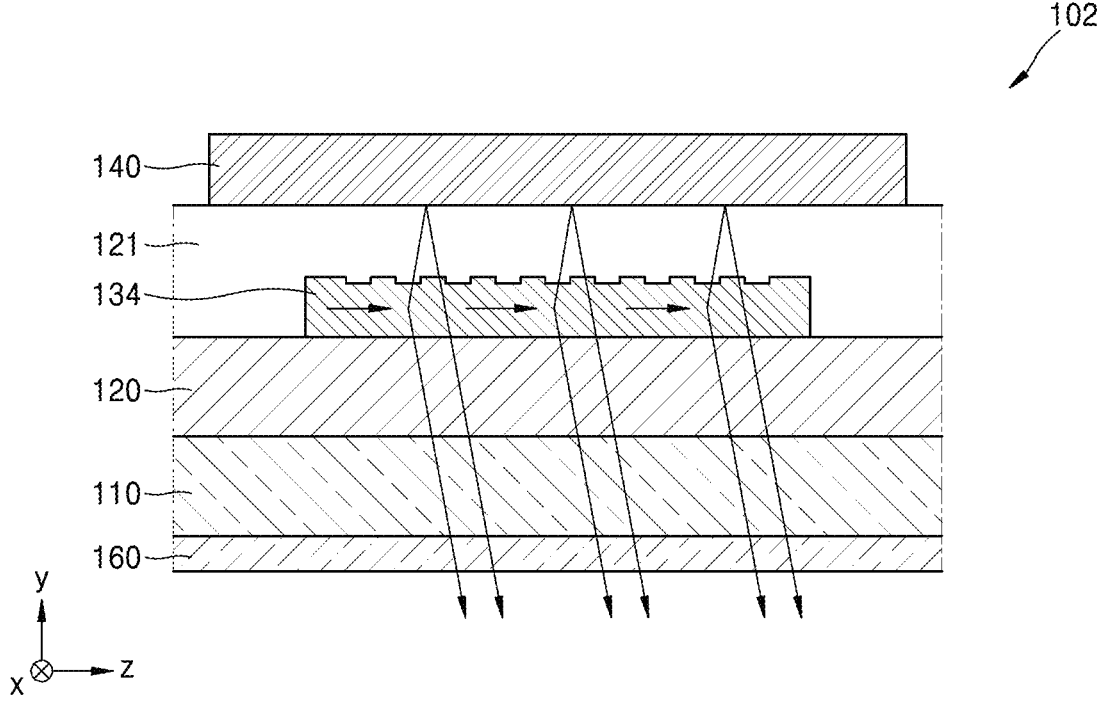
FIG. 5 is a cross-sectional view showing a portion of an optical phased array device according to some example embodiments.

FIG. 5 is a cross-sectional view showing a portion of an optical phased array device 102 according to some example embodiments.

Referring to FIG. 5, the optical phased array device 102 may include a substrate 110, a lower clad 120 disposed on the substrate 110, a light distribution unit configured to distribute a propagation path of input light into a plurality of paths, a light modulator configured to modulate a phase of the distributed light, an antenna 134 connected to the light modulator and emitting phase-modulated light, an upper clad 121 surrounding the light distribution unit, the light modulator, and the antenna 134 and including a first surface facing the substrate 110 and a second surface opposite to the first surface, and a reflective layer 140 facing the second surface of the upper clad 121 and reflecting light emitted from the antenna 134 so that the reflected light is emitted to the outside passing through the substrate 110. In describing FIG. 5, descriptions previously given with reference to FIGS. 1 to 3 will be omitted.

The optical phased array device 102 may further include a coating layer 160. The coating layer 160 may be disposed under the substrate 110 to face the antenna 134 and act as a non-reflection coating layer. The coating layer 160 may have a reflectance of 1% or less. An optical thickness of the coating layer 160 may be ¼ of a wavelength of incident light. The coating layer 160 may include a material having a refractive index between the refractive index of the substrate 110 and the refractive index of air. The coating layer 160 may include, for example, a material, such as SiN.

Although the reflectivity of a lower surface of the substrate 110 varies depending on the wavelength, the deviation in an amount of light according to wavelength may be minimized by disposing the coating layer 160 on the lower surface of the substrate 110.

Figure 6:
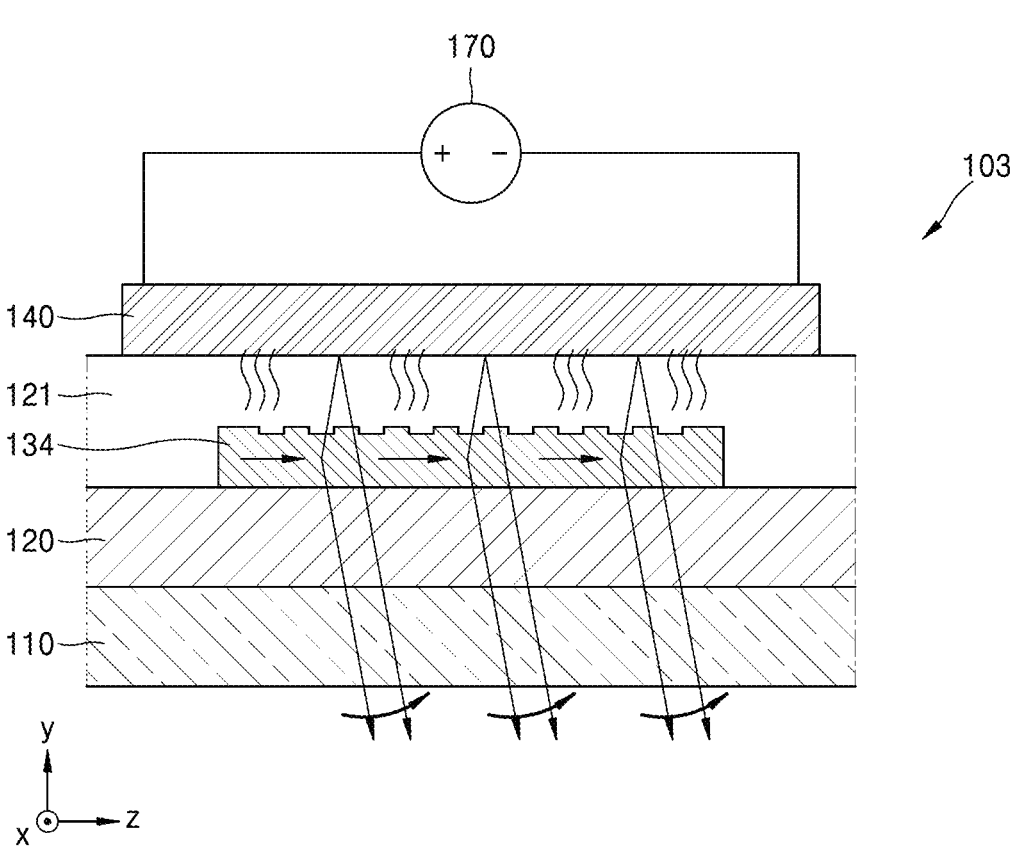
FIGS. 6, 7, and 8 are cross-sectional views showing portions of an optical phased array device according to some example embodiments.

FIG. 6 is a cross-sectional view showing a portion of an optical phased array device 103 according to some example embodiments.

Referring to FIG. 6, the optical phased array device 103 may include a substrate 110, a lower clad 120 disposed on the substrate 110, a light distribution unit configured to distribute a propagation path of input light into a plurality of paths, a light modulator configured to modulate a phase of the distributed light, an antenna 134 connected to the light modulator and emitting phase-modulated light, an upper clad 121 surrounding the light distribution unit, the light modulator, and the antenna 134 and including a first surface facing the substrate 110 and a second surface opposite to the first surface, and a reflective layer 140 facing the second surface of the upper clad 121 and reflecting light emitted from the antenna 134 so that the reflected light is emitted to the outside passing through the substrate 110. In describing FIG. 6, descriptions previously given with reference to FIGS. 1 to 3 will be omitted.

The optical phased array device 103 may further include a power supply unit 170 connected to the reflective layer 140. The power supply unit 170 may change the temperature of the reflective layer 140 and the antenna 134 by Joule heat generated by flowing a current through the reflective layer 140, for example heating the reflective layer 140 via resistive heating and thus heating at least the antenna 134 based on conductive heat transfer through the upper clad 121. The power supply unit 170 may change the temperature of the antenna 134, thereby changing the refractive index of the antenna 134 and changing the emission angle of light. For example, the power supply unit 170 may increase the light emission angle by increasing the temperature of the antenna 134. In some example embodiments, the power supply unit 170 may include a direct-current (DC) power source, which may include, for example, a battery, such as a rechargeable lithium-ion battery. In some example embodiments, the power supply unit 170 may include an alternating-current (AC) power source.

Figure 7:
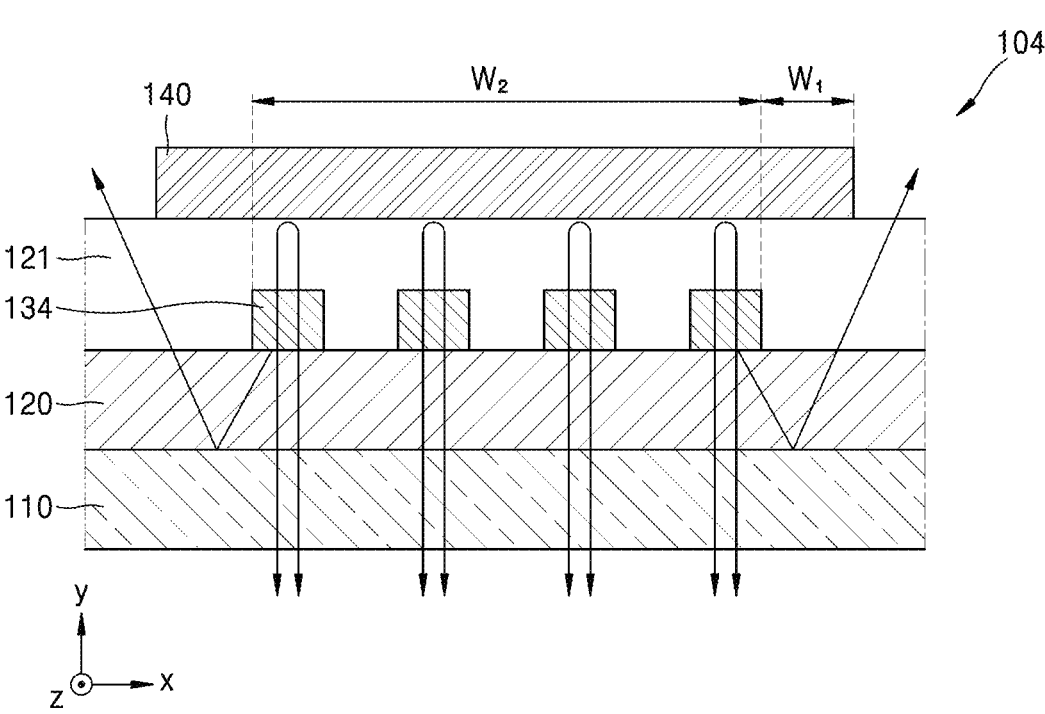

FIG. 7 is a cross-sectional view showing a portion of an optical phased array device 104 according to some example embodiments.

Referring to FIG. 7, the optical phased array device 104 includes a substrate 110, a lower clad 120 disposed on the substrate 110, a light distribution unit configured to distribute a propagation path of input light into a plurality of paths as distributed light, a light modulator configured to modulate a phase of the distributed light to establish phase-modulated light, an antenna 134 connected to the light modulator and emitting the phase-modulated light, an upper clad 121 surrounding the light distribution unit, the light modulator, and the antenna 134 and including a first surface facing the substrate 110 and a second surface opposite to the first surface, and a reflective layer 140 facing the second surface of the upper clad 121 and configured to reflect light emitted from the antenna 134 so that the reflected light is emitted to the outside (an exterior environment that is external to the optical phased array device 104) based on passing through the substrate 110. In describing FIG. 7, descriptions previously given with reference to FIGS. 1 to 3 will be omitted.

The optical phased array device 104 may include the reflective layer 140 disposed above the antenna 134. The reflective layer 140 may be disposed to cover only up to a distance $W_1$ in a width direction of the antenna 134. A width $W_2 + 2 W_1$ of the reflective layer 140 may be formed to have a margin within 5 times a width $W_2$ of the antenna 134. That is, a width $W_1$ may be formed to be 5 times or less than the width $W_2$. In other words, the width $W_2 + 2 W_1$ of the reflective layer 140 may be within 11 times the width $W_2$ of the antenna 134 (e.g., equal to or less than 11 times the width $W_2$ of the antenna 134, for example between about equal to the width $W_2$ of the antenna 134 to about 11 times the width $W_2$ of the antenna 134). According to some example embodiments, when $W_1$ is set to about 3 times the total width of the antenna $W_2$ and an input of 0 dBm is input to the input coupler, light of about −50 dBm may be detected.

Because the width of the reflective layer 140 is limited, some pieces of light also come out in the +y direction as well, and thus, an optical fiber for transmitting light emitted from a light source to an input coupler may be used for monitoring purposes to align the optical fiber to the position of the input coupler. That is, because an input optical fiber is connected to the top of the optical phased array device 104, an optical fiber aligning process may be facilitated as light may be input and output in the same direction.

Figure 8:
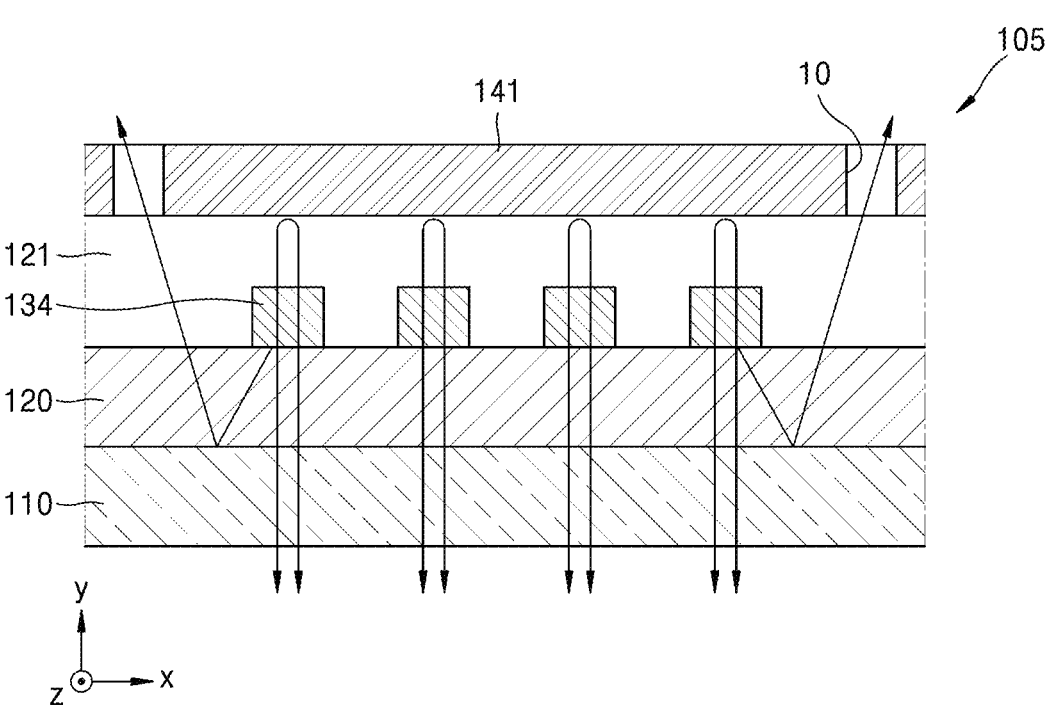

FIG. 8 is a cross-sectional view showing a portion of an optical phased array device 105 according to some example embodiments.

Referring to FIG. 8, the optical phased array device 105 may include a substrate 110, a lower clad 120 disposed on the substrate 110, a light distribution unit configured to distribute a propagation path of input light into a plurality of paths as distributed light, a light modulator configured to modulate a phase of the distributed light to establish phase-modulated light, an antenna 134 connected to the light modulator and emitting the phase-modulated light, an upper clad 121 surrounding the light distribution unit, the light modulator, and the antenna 134 and including a first surface facing the substrate 110 and a second surface opposite to the first surface, and a reflective layer 141 facing the second surface of the upper clad 121 and reflecting light emitted from the antenna 134 so that the reflected light is emitted to the outside (e.g., an exterior environment that is external to the optical phased array device 105) based on passing through the substrate 110. In describing FIG. 8, descriptions previously given with reference to FIGS. 1 to 3 will be omitted.

The optical phased array device 105 may include the reflective layer 141 disposed above the antenna 134. The reflective layer 141 may include one or more holes 10. The hole 10 may be arranged so as not to overlap with the antenna 134 in a vertical direction extending perpendicular to the substrate 110 (e.g., the y direction), for example to be offset from the antenna 134 in a horizontal direction extending parallel to the substrate 110 (e.g., the x direction) so as to be exposed from the antenna 134 in the vertical direction. A cross section of the hole 10 (e.g., in an xz plane extending parallel to the substrate 110) may have a circular shape or a polygonal shape.

Because the reflective layer 141 includes the hole 10, some part of light exits the optical phased array device 105 in the +y direction through the hole 10, and thus, the hole 10 may be used for monitoring purposes to align an optical fiber in the input coupler. That is, because the optical fiber is connected to the top of the optical phased array device 105, an optical fiber aligning process may be facilitated as light may be input and output in the same direction.

Figure 9:
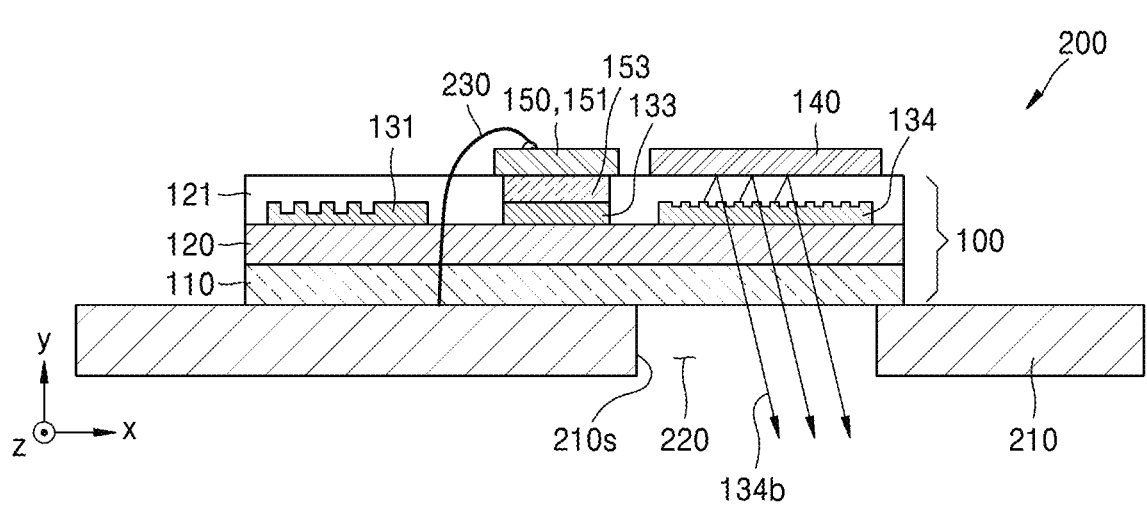
FIGS. 9, 10, and 11 are cross-sectional views illustrating a package of an optical phased array device according to some example embodiments.
Figure 10:
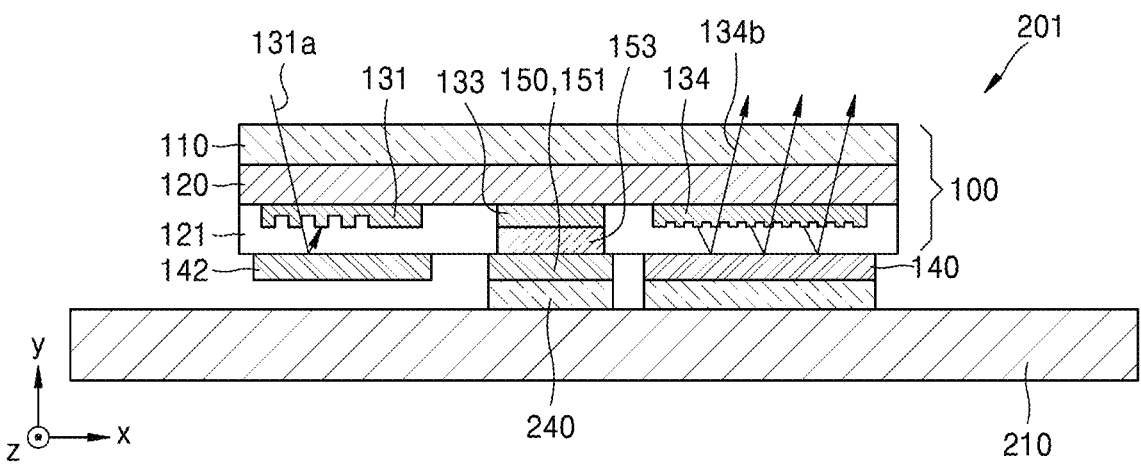
Figure 11:
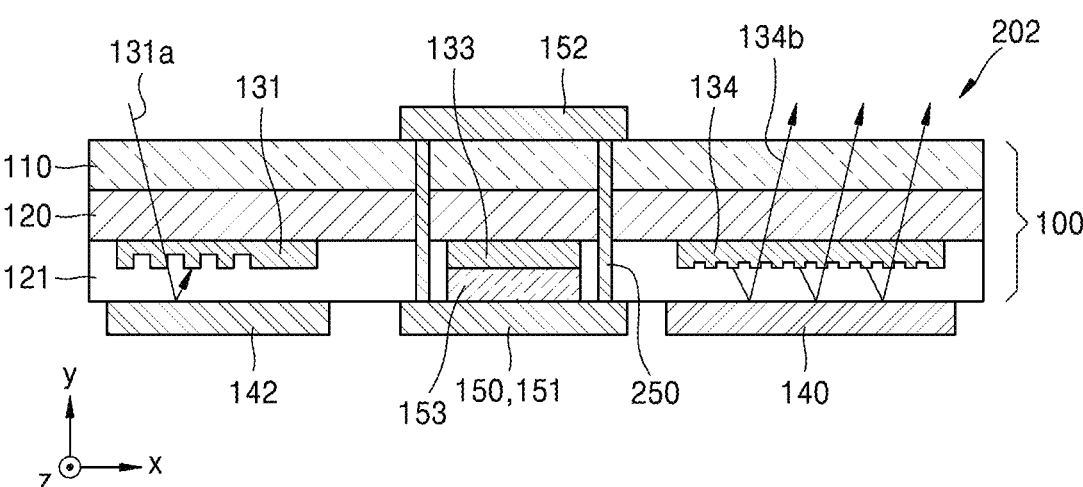

FIGS. 9, 10, and 11 are cross-sectional views illustrating an optical phased array device package 200 according to some example embodiments.

Referring to FIG. 9, the optical phased array device package 200 may be provided. The optical phased array device package 200 may include an optical phased array device 100, a base 210, and a connection member. The connection member may include a wire 230. The optical phased array device 100 may be the same as one of the optical phased array devices 100, 101, 102, 103, 104, and 105 of FIGS. 1 to 8. In describing FIG. 9, descriptions previously given with reference to FIGS. 1 to 8 will be omitted.

The optical phased array device 100 may be disposed on the base 210. The substrate 110 of the optical phased array device 100 may contact the base 210. The base 210 may be a package substrate including a plurality of wires. For example, the base 210 may include a printed circuit board (PCB). In one example, a processor for controlling a sensor may be disposed on the base 210, and wires may electrically connect the sensor and the processor. In one example, the processor controlling the sensor may be provided outside, and wires may electrically connect the sensor and the outside processor.

The base 210 may include a hole 220 formed through a portion of the base 210 facing a lower region of the antenna 134 (e.g., a hole at least partially defined by one or more inner surfaces 210s of the base 210). That is, the hole 220 may be disposed to overlap (e.g., expose from the base 210) the antenna 134 in a vertical direction (e.g., the y direction). Light (e.g., phase-modulated light 134b) reflected by the reflective layer 140 (alone or in addition to phase-modulated light 134a emitted directly from the antenna 134 in the −y direction) may pass through the base 210 through the hole 220 of the base 210. The hole 220 may have a diameter of about 1 cm or less (e.g., a diameter greater than 0 cm and equal to or smaller than about 1 cm).

The optical phased array device package 200 may include a wire 230. The wire 230 may connect a metal pad of the base 210 to a first electrode 150 of the optical phased array device 100 to form a package. The wire 230 may include, for example, a gold wire.

Referring to FIG. 10, an optical phased array device package 201 may be provided. The optical phased array device package 201 may include an optical phased array device 100, a base 210, and a connection member. The connection member may include a plurality of connection elements 240. The optical phased array device 100 may be the same as one of the optical phased array devices 100, 101, 102, 103, 104, and 105 of FIGS. 1 to 8. In describing FIG. 10, descriptions previously given with reference to FIGS. 1 to 8 will be omitted.

The optical phased array device package 201 may have a structure in which upper and lower sides of the optical phased array device 100 are inverted. The optical phased array device package 201 may include a flip-chip package. The optical phased array device package 201 may include a reflective layer 142 below an input coupler 131, and reflect light through the reflective layer 142 to allow light (e.g., input light 131a) to enter the input coupler 131. The reflective layer 142 may be the same as the reflective layer 140 of FIG. 2.

The base 210 may be a package substrate including a plurality of wires. For example, the base 210 may include a PCB. In one example, a processor for controlling a sensor is disposed on the base 210, and wires may electrically connect the sensor to the processor. In one example, the processor controlling the sensor may be provided outside, and the wires may electrically connect the sensor to the external processor.

The optical phased array device package 201 may include a plurality of connection elements 240. The plurality of connection elements 240 may be disposed on the base 210, and the optical phased array device 100 may be electrically connected to the base 210 through the plurality of connection elements 240. Specifically, by connecting the reflective layer 140 and the first electrode 150 of the optical phased array device 100 to the plurality of connection elements 240, the optical phased array device 100 is electrically connected to the base 210 to form a package. The connection elements 240 may include a bump. The connection element 240 may include, for example, a solder bump, a copper pillar bump, or a gold bump.

Referring to FIG. 11, an optical phased array device package 202 may be provided. The optical phased array device package 202 may include an optical phased array device 100 and a via 250. The optical phased array device 100 may be the same as one of the optical phased array devices 100, 101, 102, 103, 104, and 105 of FIGS. 1 to 8. In the description of FIG. 11, overlapping content with FIGS. 1 to 8 will be omitted.

The optical phased array device package 202 may have a structure in which the upper and lower portions of the optical phased array device 100 are inverted. The optical phased array device package 202 may include a reflective layer 142 below an input coupler 131, and reflect light through a reflective layer 142 to allow light to enter the input coupler 131. The reflective layer 142 may be the same as the reflective layer 140 of FIG. 2.

The plurality of connection elements 240 may include vias 250. The via 250 may be electrically connected to first and second electrodes 150 and 151 and electrically connected to an electrode pad 152. The via 250 may penetrate through the optical phased array device 100. The via 250 may connect the first and second electrodes 150 and 151 and the electrode pad 152 to form a package. The via may be a through-silicon-via (TSV).

Figure 12:
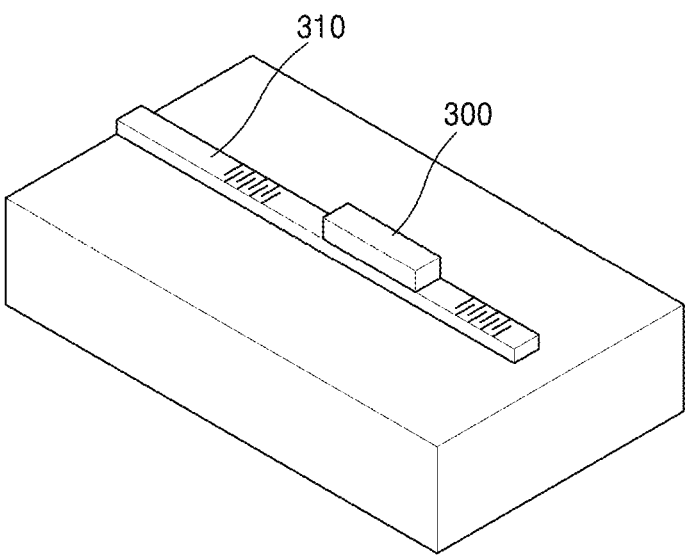
FIGS. 12, 13, and 14 are perspective views illustrating a light source according to some example embodiments.
Figure 13:
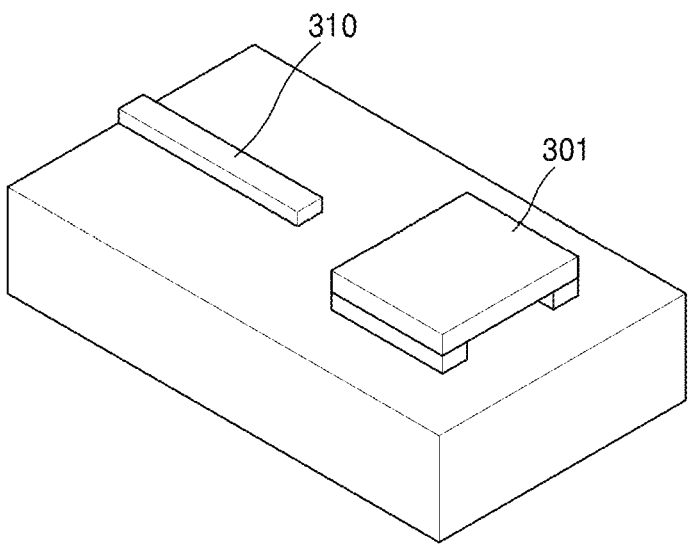
Figure 14:
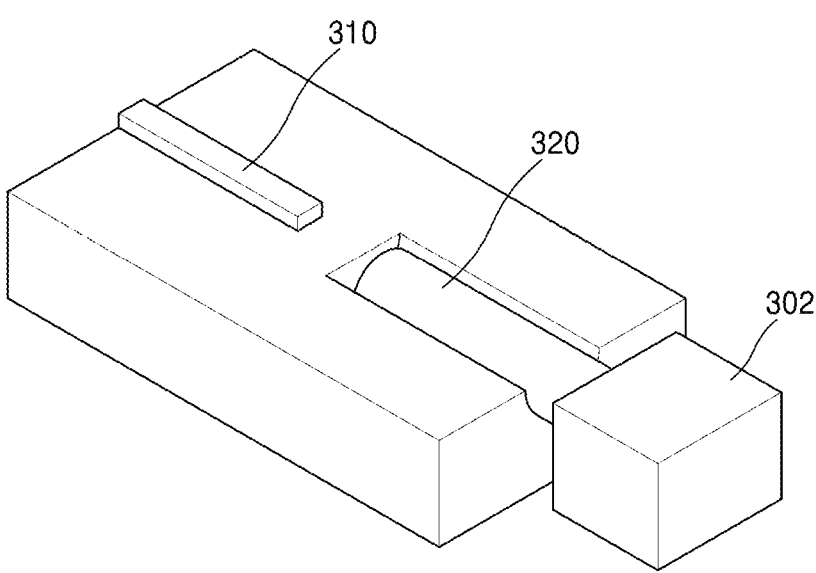

FIGS. 12, 13, and 14 are perspective views illustrating a light source according to some example embodiments.

The light source may be directly coupled (on-chip) or indirectly coupled (off-chip) to a waveguide. An on-chip light source may be implemented through Group III-V semiconductor coupling or epitaxial growth. An off-chip light source may be implemented utilizing vertical coupling, horizontal coupling, edge coupling, or chip alignment of an external light source.

Referring to FIG. 12, an on-chip light source 300 may be integrated into a waveguide 310. The light source 300 may be formed by heterojunction of a Group III-V semiconductor material on a silicon waveguide 310 to a substrate using a wafer bonding technique. The light source 300 may replace the input coupler 131 of the optical phased array device 100 of FIG. 1. Light emitted from the light source 300 may be input to the light distribution unit 132 of the optical phased array device 100 of FIG. 1.

Referring to FIG. 13, a light source 301 may be flip chip bonded. The light source 301 may be included in an optical phased array device to configure a single integrated circuit. After manufacturing a laser chip from a semiconductor chip using a Group III-V compound semiconductor, light may be directly transferred to the waveguide 310 by contacting the laser chip to an optical phased array device through a metal. The light source 301 may replace the input coupler 131 of the optical phased array device 100 of FIG. 1. Light emitted from the light source 301 may be input to the light distribution unit 132 of the optical phased array device 100 of FIG. 1.

Referring to FIG. 14, a light source 302 may be indirectly coupled (off-chip) to the waveguide 310. The light source 302 may not be included in the optical phased array device. The light source 302 may be disposed outside an optical phased array device and transfer light to the waveguide 310 through an optical fiber 320 utilizing a horizontal coupling.

Figure 15:
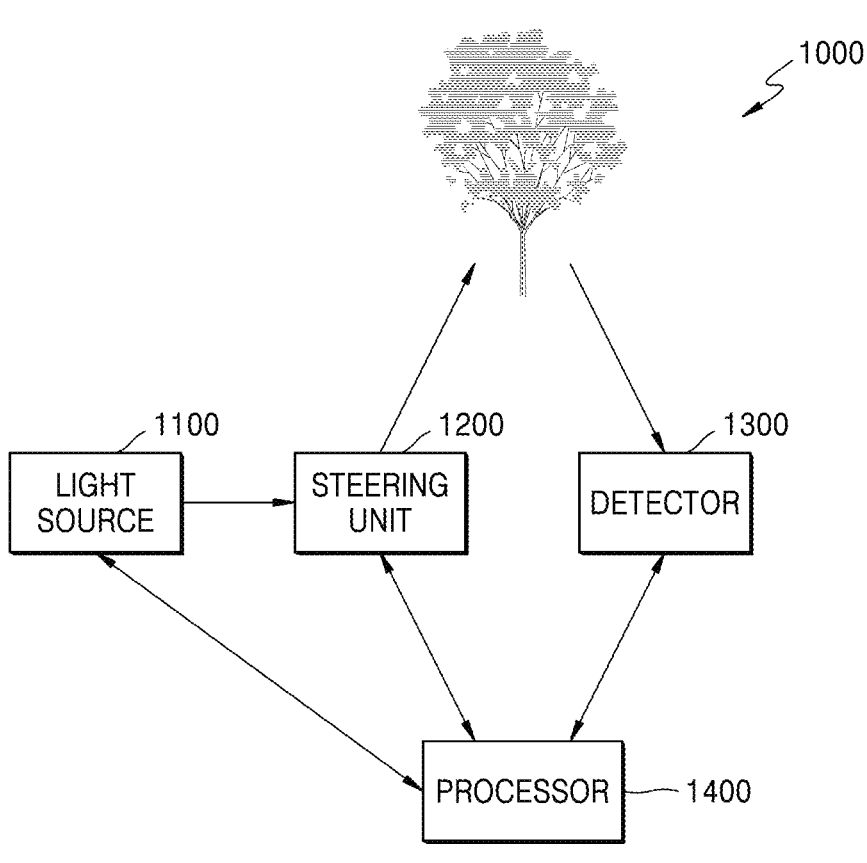
FIG. 15 is a diagram showing a LiDAR device according to some example embodiments.

FIG. 15 is a diagram showing a LiDAR device 1000 according to some example embodiments.

As shown in FIG. 15, the LiDAR device 1000 may include a light source 1100 configured to generate light, a steering unit 1200 configured to steer light output from the light source 1100 toward an object, a detector 1300 configured to detect light reflected from the object, and a processor 1400 configured to perform an operation for obtaining information about the object from the light detected by the detector 1300. The LiDAR device 1000 may further include a plurality of waveguides providing optical connection between the light source 1100 and the steering unit 1200 and between the steering unit 1200 and the detector 1300, respectively. The light source 1100, the steering unit 1200, the detector 1300, and the processor 1400 may be implemented as separate devices or as one device.

The light source 1100 may be a tunable laser capable of adjusting the wavelength of emitted light. A plurality of laser beams may be emitted from the light source 1100, and among the plurality of laser beams, laser beams having optical coherency may be incident to the steering unit 1200. The light source 1100 may generate and output light of a plurality of different wavelength bands. In addition, the light source 1100 may generate and output pulsed light or continuous light.

The light source 1100 may include a laser diode (LD), an edge emitting laser, a vertical-cavity surface emitting laser (VCSEL), a distributed feedback laser, a light emitting diode (LED), a super luminescent diode (SLD), etc.

The light source 1100 may be directly coupled (on-chip) or indirectly coupled (off-chip) to a waveguide. The light source 1100 may be the same as the light sources 300, 301, and 302 of FIGS. 12 to 14. An on-chip light source may be implemented through Group III-V coupling or epitaxial growth. An off-chip light source may be implemented using vertical coupling, edge coupling, or chip alignment of an external light source.

The steering unit 1200 illuminates the object by changing a traveling direction of light from the light source 1100, and may include an optical phased array device or an optical phased array device package capable of adjusting the direction of light without mechanical movement. The optical phased array device may be the same as the optical phased array devices 100, 101, 102, 103, 104, 105 of FIGS. 1 to 8, and the optical phased array device package may be the same as the optical phased array device packages 200, 201, and 202 of FIGS. 9 to 11. The steering unit 1200 may transmit amplified light toward a localized forward area in a one-dimensional (1D) or two-dimensional (2D) scanning method. To this end, the steering unit 1200 may sequentially or non-sequentially steer light focused in a narrow area to forward 1 D or 2D areas at regular time intervals. For example, the steering unit 1200 may be configured to emit laser light from bottom to top or from top to bottom with respect to forward one-dimensional areas. In addition, the steering unit 1200 may be configured to emit laser light from left to right or from right to left with respect to forward one-dimensional areas.

The detector 1300 may detect light reflected by the object and generate an electrical signal based on the detected light. The detector 1300 may include an array of light detection elements. The detector 1300 may further include a spectroscopic device for analyzing the light reflected from object for each wavelength.

The processor 1400 may perform an operation for obtaining information about the object from the light detected by the detector 1300. In addition, the processor 1400 may oversee processing and control of the entire LiDAR device 1000. The processor 1400 may obtain and process information about the object. For example, the processor 1400 may acquire (e.g., generate) and process 2D or 3D image information. The processor 1400 may generally control the driving of the light source 1100 and the steering unit 1200 or the operation of the detector 1300. For example, the processor 1400 may control an electrical signal applied to an optical phased array device included in the steering unit 1200. The processor 1400 may also analyze a distance between a target and the LiDAR device 1000, a shape of the target, and the like through the numerical information provided by the detector 1300.

The 3D image acquired by the processor 1400 may be transmitted to and utilized by another unit. For example, such information may be transmitted to the processor 1400 of an autonomous driving device, such as a vehicle or a drone in which the LiDAR device 1000 is employed. For example, an autonomous driving device may process a 3D image acquired (e.g., generated) by the processor 1400 of the LiDAR device 1000 to navigate (e.g., drive) through an external (e.g., ambient) environment. In addition, such information may be utilized in smart phones, mobile phones, personal digital assistants (PDAs), laptops, personal computers (PCs), wearable devices, and other mobile or non-mobile computing devices.

The LiDAR device 1000 according to some example embodiments may be applied to smart phones, mobile phones, personal digital assistants (PDAs), laptops, personal computers (PCs), wearable devices, etc. For example, a smart phone may extract depth information of objects in an image, adjust out-of-focusing of an image, or automatically identify objects in an image by using the LiDAR device 1000, which is an object 3D sensor.

In addition, the LiDAR device 1000 according to some example embodiments may be applied to (e.g., included in) a vehicle. A vehicle may include a plurality of LiDAR devices 1000 disposed in various locations. The vehicle may provide various information about the inside or surroundings of the vehicle to the driver using the LiDAR device 1000, and may automatically recognize objects or people in the image to provide information necessary for autonomous driving.

Accordingly, according to implementations according to the technical scope of the inventive concepts, it may be confirmed that an optical phased array device with reduced optical loss and a LiDAR device including the same may be provided.

In the optical phased array device and the LIDAR device including the same according to some example embodiments of the inventive concepts, a reflective layer is disposed on an antenna to direct all light emitted from the antenna in a downward direction, thereby reducing light loss.

As described herein, any devices, systems units, modules, blocks, and/or portions thereof according to any of the example embodiments (e.g., the LiDAR device 1000, the light source 1100, the steering unit 1200, the detector 1300, the processor 1400, any portion thereof, or the like) may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems units, modules, blocks, and/or portions thereof according to any of the example embodiments, and/or any portions thereof.

The optical phased array device and the LiDAR device including the same have been described with reference to some example embodiments shown in the drawings. However, it will be understood by those of ordinary skill in the art that various changes in form and details may be made therein without departing from the spirit and scope of the inventive concepts. Therefore, some example embodiments should be considered in descriptive sense only and not for purposes of limitation. The scope of the inventive concepts are defined not by the detailed description of the inventive concepts but by the appended claims, and all differences within the scope will be construed as being included in the inventive concepts.

It should be understood that example embodiments described herein should be considered in a descriptive sense only and not for purposes of limitation. Descriptions of features or aspects within each example embodiment should typically be considered as available for other similar features or aspects in other example embodiments. While some example embodiments have been described with reference to the figures, it will be understood by those of ordinary skill in the art that various changes in form and details may be made therein without departing from the spirit and scope as defined by the following claims.

What is claimed is:

1. An optical phased array device, comprising:
a substrate;
a light distribution unit configured to distribute input light along a plurality of paths as distributed light;
a light modulator configured to modulate a phase of the distributed light to establish phase-modulated light;
an antenna configured to emit the phase-modulated light;
a clad surrounding the light distribution unit, the light modulator, and the antenna, the clad including a first surface facing the substrate and a second surface opposite the first surface; and
a reflective layer facing the second surface of the clad, the reflective layer configured to reflect the phase-modulated light emitted from the antenna so that reflected light is emitted to an exterior environment that is external to the optical phased array device based on passing through the substrate.

2. The optical phased array device of claim 1, wherein the reflective layer faces the antenna on the second surface of the clad.

3. The optical phased array device of claim 1, further comprising an input coupler configured to receive light from the exterior environment.

4. The optical phased array device of claim 1, wherein the reflective layer includes a metal or dielectric.

5. The optical phased array device of claim 1, wherein the reflective layer includes at least one metal selected from silver (Ag), gold (Au), aluminum (Al), platinum (Pt), copper (Cu), chromium (Cr), and nickel (Ni).

6. The optical phased array device of claim 1, wherein the reflective layer includes
at least one oxide selected from $SiO_2$, $TiO_2$, $Al_2O_3$, and $Ta_2O_5$, or
at least one fluoride selected from $MgF_2$, $LaF_3$, and $AlF_3$.

7. The optical phased array device of claim 1, wherein a width of the reflective layer is equal to or less than 11 times a width of the antenna.

8. The optical phased array device of claim 1, wherein the reflective layer includes one or more holes that do not overlap with the antenna in a vertical direction extending perpendicular to the substrate.

9. The optical phased array device of claim 1, wherein the antenna includes a plurality of grating patterns.

10. The optical phased array device of claim 1, further comprising a power supply unit connected to the reflective layer, the power supply unit configured to apply heat to the reflective layer.

11. The optical phased array device of claim 1, further comprising a first electrode and a second electrode in the light modulator.

12. The optical phased array device of claim 11, wherein the first electrode and the second electrode and the reflective layer include a same material.

13. The optical phased array device of claim 1, further comprising a coating layer under the substrate to face the antenna.

14. The optical phased array device of claim 1, wherein a lower surface of the substrate has an RMS surface roughness of about 100 Å or less.

15. The optical phased array device of claim 1, wherein an optical connection between the light distribution unit, the light modulator, and the antenna is an optical waveguide-based structure.

16. An optical phased array device package, comprising:
a base;
an optical phased array device on the base; and
a connection member connecting the base to the optical phased array device,
wherein the optical phased array device includes
  a substrate,
  a light distribution unit configured to distribute input light along a plurality of paths as distributed light,
  a light modulator configured to modulate a phase of the distributed light to establish phase-modulated light,
  an antenna configured to emit the phase-modulated light,
  a clad surrounding the light distribution unit, the light modulator, and the antenna, the clad including a first surface facing the substrate and a second surface opposite the first surface, and
  a reflective layer facing the second surface of the clad, the reflective layer configured to reflect the phase-modulated light emitted from the antenna so that reflected light is emitted to an exterior environment that is external to the optical phased array device based on passing through the substrate.

17. The optical phased array device package of claim 16, wherein the connection member includes a wire, and the base includes a hole.

18. The optical phased array device package of claim 16, wherein
the connection member includes a connection element, and
the optical phased array device is electrically connected to the base through the connection element.

19. The optical phased array device package of claim 16, further comprising:
a first electrode and a second electrode in the light modulator;
an electrode pad under the substrate; and
a via, the via penetrating through the optical phased array device,
wherein the via connects the first electrode to the second electrode to the electrode pad.

20. A LiDAR device, comprising:
a light source;
a steering unit;
a detector; and
a processor,
wherein the steering unit includes
  a substrate,
  a light distribution unit configured to distribute input light along a plurality of paths as distributed light,
  a light modulator configured to modulate a phase of the distributed light to establish phase-modulated light,
  an antenna configured to emit the phase-modulated light,
  a clad surrounding the light distribution unit, the light modulator, and the antenna, the clad including a first surface facing the substrate and a second surface opposite the first surface, and
  a reflective layer facing the second surface of the clad, the reflective layer configured to reflect the phase-modulated light emitted from the antenna so that reflected light is emitted to an exterior environment that is external to the steering unit based on passing through the substrate.

* * * * *